Patented Nov. 24, 1942

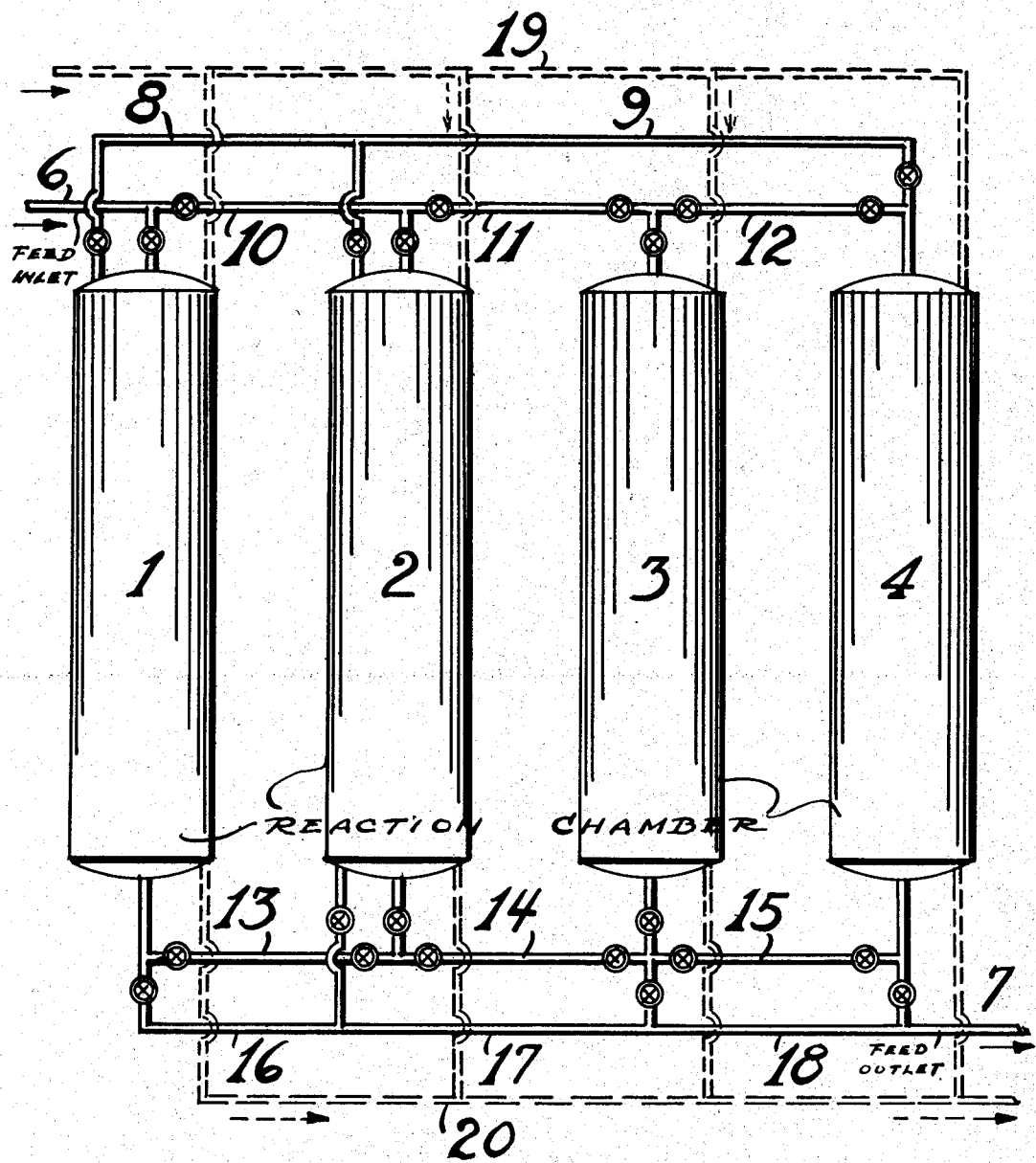

2,303,076

UNITED STATES PATENT OFFICE 2,303,076

TREATMENT OF HYDROCARBONS

Per K. Frolich, Westfield, N. J., assignor to Standard Oil Development Company, a corporation of Delaware Application May 18, 1938, Serial No. 208,545

1 Claim. (Cl. 196—49)

The invention relates to the treatment of hydrocarbons in the presence of a catalyst and more particularly to the cracking and reforming of petroleum oils and derivatives of substances containing tar, such as coal and lignite.

In the catalytic treatment of hydrocarbon vapors, carbonaceous material is deposited in the catalyst, necessitating periodic regeneration by burning out the carbon deposit.

As is well known, catalytic reforming and catalytic cracking processes are endothermic rather than exothermic in that heat is consumed in the process, with a resulting decrease in temperature. In order to maintain the temperature at a relatively constant level throughout the cracking zone, it is necessary to supply heat to the vapors during their passage through to the reaction zone. It is extremely difficult to carry out such an operation on a commercial scale because of the practical objections to supplying heat at a high temperature level, particularly when this temperature level is to be maintained constant within narrow limits.

In view of this, it has been proposed to preheat the oil vapors passing to the reaction zone to a temperature sufficient to effect the desired conversion without the application of additional heat to the products passing through the reaction zone. This requires heating the oil vapors initially to a temperature sufficiently above the desired reaction temperature to compensate for the drop in temperature through the reaction zone. When operating in this manner, the vapors to be cracked when first coming in contact with fresh catalyst tend to become over-cracked resulting in the formation of excessive gas losses.

One of the objects of this invention is to provide a method which will permit supplying sufficient heat to the fresh vapors to effect the desired amount of cracking and which at the same time will avoid undesirable overcracking in the initial stage of the reaction zone.

In accordance with my invention, the feed stock to be cracked is initially heated to a temperature sufficient to accomplish the desired amount of cracking without the addition of further heat during the reaction period. The fresh highly heated vapors are then passed through a catalyst zone or zone containing catalyst of progressively increasing activity so that the highly heated vapors contact with the less active catalyst and overcracking is avoided. As the temperature becomes lower, the activity of the catalyst increases so that throughout the cracking period substantially uniform conversion is effected. In other words, as the temperature of the vapors drops off due to the endothermic nature of the reaction, the activity of the catalyst is increased so that a relatively uniform rate of conversion is accomplished throughout the cracking zone.

My invention further comprehends a novel arrangement of apparatus for accomplishing the desired objectives. It will be understood, however, that the method is not restricted to the particular apparatus illustrated nor is the apparatus limited to carrying out the specific method disclosed.

Other objects and advantages will appear as the description proceeds.

In the accompanying drawing, I have illustrated diagrammatically an arrangement of apparatus suitable for carrying out my improved method. It will be understood that the method is adapted for use with any number of reaction chambers although I consider that the employment of four chambers gives very satisfactory temperature control, three of the chambers being "on stream" while the fourth is "on regeneration."

I have shown in the drawing four reaction chambers 1, 2, 3, and 4 arranged in series. These may be of any conventional construction suitable for use in the cracking or reforming of hydrocarbons. In the layout chosen for the purpose of illustration, a double manifold extends over the top of the chambers, and they are connected together at the bottom by another double manifold so arranged as to permit periodic regeneration of the catalyst in the several chambers.

The gaseous hydrocarbon feed stock is introduced into the system through the feed line 6 and the reaction products are withdrawn through the line 7. For convenience of reference in describing the flow of the hydrocarbon vapors through the several reactors and connecting headers or manifolds, the connecting portions of the headers have been numbered consecutively from 8 to 18, inclusive. The dotted lines 19 and 20 represent manifolds and connections for regenerating gas and it will be understood that these manifolds and connections are provided with valves so arranged as to permit regeneration of the catalyst in each reaction chamber in rotation.

I shall now describe the operation of my improved method as applied to the cracking of petroleum oil. Consider first that the chamber 4 has been removed from the cracking cycle for regeneration, that the reaction chamber 1 contains the oldest useable catalyst (i. e., the catalyst with the largest deposit of carbonaceous material), that reaction chamber 2 contains a lesser amount of carbonaceous deposit and reaction chamber 3 either a new bed of catalyst or a freshly regenerated catalyst. The valves in the headers and connecting pipes are set in the proper positions to produce flow in the cycle indicated by the following sequence: 6, 1, 13, 2, 11, 3, 18, 7. After flow in accordance with this cycle has continued up to the point where the catalyst in chamber 1 is to be regenerated, the valves $v$ and the valves in the regenerator connections are set so as to produce flow of regenerating gases through the chamber 1 and flow of the hydrocarbon vapors in accordance with the following cycle: 6, 10, 2, 14, 3, 12, 4, 7.

Similarly when the catalyst in chamber 1 has been regenerated and that in chamber 2 is ready for regeneration, the latter is removed from the cracking cycle and placed on regeneration, the valves being set to provide flow of the hydrocarbon vapors in accordance with the cycle 6, 10, 11, 3, 15, 4, 9, 8, 1, 16, 17, 18, 7. Finally, when reaction chamber 3 is to be placed on regeneration, the valves are set to produce flow in accordance with the cycle 6, 10, 11, 12, 4, 15, 14, 13, 1, 8, 2, 17, 18, 7.

The invention is not predicated upon any particular arrangement of apparatus but rather upon the novel steps of the method which comprises bringing the vaporized hydrocarbons first into contact with a catalyst having a substantial carbon deposit in association therewith, and bringing the products of this reaction into contact with a catalyst having an appreciably lower carbon deposit per unit volume. The arrangement of apparatus which I have described is adapted to the practice of these steps and also the practice of a method comprising the steps of bringing the vaporized hydrocarbons consecutively into contact with separate catalytic masses having successively decreasing amounts of carbon in association therewith, each of these successive contacts being effected at a lower temperature than the preceding contact. Substantially all of the products leaving any given one of the reaction chambers is conducted to the succeeding reaction chamber in the series without intermediate fractionation or separation of any of its fractions. In this way, it is possible to take advantage of the endothermic nature of the reaction in order to adjust or assist in adjusting the temperature at which a succeeding cracking step is to be performed. This is a decided advantage when employing successive beds of catalyst adapted to efficient operation at decreasing temperatures.

In practicing the method which I have described, the temperature in the first reaction chamber is the highest and results in substantial conversion while avoiding excessive gas formation. The last chamber containing the most newly regenerated catalyst is operated at the lowest temperature, which also decreases gas formation which proceeds at a lower rate as the temperature is decreased. The result is a maximum conversion for the complete cycle. As the conversion in the first chamber drops to an extent that it no longer becomes profitable to operate it, the valves are then set so as to remove it from the system and it is subjected to regeneration, the feed being diverted to the second chamber and continued through the remaining chambers up to and including the one containing the fresh catalyst which has just been removed from the regenerating cycle and returned to the cracking cycle.

When my method is to be used in the cracking of gas oils or heavier, the temperatures in the reaction chambers ordinarily will vary from 900 to 950° F., in the first chamber of the series, to about 800 to 850° F. in the last chamber. It should be understood that reference to the first chamber of the series means the one which contains the catalyst with the largest amount of carbon deposit and reference to the last chamber means the one which contains the lowest amount of carbon deposit, irrespective of the particular arrangement of the chambers. I prefer to maintain the temperature in the first chamber at between 900 to 950° F., with successively decreasing temperatures in the succeeding chambers, bringing the temperature in the last chamber to about 800 to 850° F. As previously pointed out, the maintenance of the temperatures in succeeding stages of the cracking cycles is assisted to a substantial degree by the endothermic nature of the reaction which causes a reduction in the temperature as is desired in order to obtain optimum conditions for conversion.

In applying my method to the catalytic reforming of naphtha, the temperatures will be somewhat higher than in the catalytic cracking operation. For example, the temperature in the first chamber of the series may be maintained at 1000 to 1050° F., and that in the last chamber of the series at about 850 to 900° F. with the temperature or temperatures in the intermediate stage or stages lying between these values so that the system presents a series of reactions at successively decreasing temperatures. Substantially all of the products of each stage are carried into the succeeding stage.

The feed stock delivered to the system through the line 6 may be preheated in any suitable manner known to the art, as by means of the usual pipe still. The reaction products drawn off from the last reaction chamber of the series through the line 7 may be subjected to further processing in accordance with well-known practice as, for example, by fractionation and separation. These steps form no part of the present invention which is concerned merely with the stages of cracking, reforming, or other catalytic treatment.

This method makes it possible not only to operate successive cracking stages at temperatures approaching optimum conditions with respect to conversion in accordance with the condition of the catalyst, but also to take advantage of the endothermic nature of the reaction to assist in bringing the temperature to the desired value for each succeeding stage. These results are accomplished without the necessity of providing a large amount of equipment. These and similar advantages of the method disclosed herein may be attained in substantial degree with arrangements of apparatus quite different than that described for the purpose of illustration. The terms and expressions which are employed are used as terms of description and not of limitation, and there is no intention of excluding any equivalents of the invention set forth, or of portions thereof.

I claim:

In a process for the catalytic cracking of hydrocarbon oils wherein a bank of catalytic converters containing a mass of cracking catalyst is provided which is subjected to periodic regeneration in situ to remove carbonaceous deposits formed thereon during the cracking treatment and wherein the cracking and regeneration periods in the individual converters are arranged in staggered relation one to another in such manner that when one converter is starting a cracking period another converter is at a later stage of the cracking period while another is undergoing regeneration; the improvement which comprises initially passing the oil to be cracked through the converter in the later stages of the cracking period and thereafter passing all vapor products from the last-named converter through a converter in the earlier stages of the cracking period whereby the oil to be cracked is first contacted with partially spent catalyst which has been subjected to cracking treatment for a period and thereafter in contact with a catalyst which has been subjected to cracking treatment for a substantially shorter period.

PER K. FROLICH.